(12) United States Patent
McLaughlin et al.

(10) Patent No.: US 11,212,395 B2
(45) Date of Patent: Dec. 28, 2021

(54) THROTTLING BASED ON PHONE CALL DURATIONS

(71) Applicant: Microsoft Technology Licensing, LLC, Redmond, WA (US)

(72) Inventors: Michael Vincent McLaughlin, Seattle, WA (US); Timothy Colin Larson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/578,041

(22) Filed: Sep. 20, 2019

(65) Prior Publication Data

US 2021/0092234 A1 Mar. 25, 2021

(51) Int. Cl.
*H04M 15/00* (2006.01)
*H04M 3/22* (2006.01)

(52) U.S. Cl.
CPC ......... *H04M 15/47* (2013.01); *H04M 3/2281* (2013.01); *H04M 2203/6027* (2013.01); *H04M 2215/0148* (2013.01)

(58) Field of Classification Search
USPC .......... 379/114.14, 127.02, 144.03, 145, 189
See application file for complete search history.

(56) References Cited

U.S. PATENT DOCUMENTS

| | | | |
|---|---|---|---|
| 5,345,595 A * | 9/1994 | Johnson | H04M 15/887 455/410 |
| 5,602,906 A | 2/1997 | Phelps | |
| 5,875,236 A | 2/1999 | Jankowitz et al. | |
| 6,442,265 B1 | 8/2002 | Harlow et al. | |
| 8,443,049 B1 * | 5/2013 | Geddes | H04L 63/126 709/207 |
| 10,347,145 B1 * | 7/2019 | Braunberger | G09B 5/065 |
| 2002/0103899 A1 * | 8/2002 | Hogan | H04M 15/80 709/224 |

(Continued)

FOREIGN PATENT DOCUMENTS

WO 2017111741 A1 6/2017

OTHER PUBLICATIONS

Cimpanu, Catalin, "Phone Fraudsters are Stealing Billions each Year through a Scheme known as IRSF", Retrieved From: https://www.zdnet.com/article/phone-fraudsters-are-stealing-billions-each-year-through-a-scheme-known-as-irsf/, Jan. 8, 2019, 21 Pages.

(Continued)

*Primary Examiner* — Yosef K Laekemariam
(74) *Attorney, Agent, or Firm* — Mannava & Kang, P.C.

(57) ABSTRACT

According to examples, an apparatus may include a processor and a computer readable medium on which is stored machine readable instructions that may cause the processor to determine a call duration threshold assigned to an entity, in which a phone number may be associated with the entity. The processor may also track durations of one or more calls placed to the phone number, determine whether the tracked durations of the one or more calls placed to the phone number meet or exceed the call duration threshold, and based on a determination that the tracked durations meet or exceed the call duration threshold, throttle placement of an additional call to the phone number.

18 Claims, 5 Drawing Sheets

(56) References Cited

U.S. PATENT DOCUMENTS

2005/0249341 A1* 11/2005 Mahone ................. H04L 43/16
379/114.14
2007/0121596 A1* 5/2007 Kurapati ............. H04M 7/0078
370/356
2014/0376705 A1 12/2014 Layman et al.

OTHER PUBLICATIONS

"International Search Report and Written Opinion Issued in PCT Application No. PCT/US2020/038851", dated Oct. 13, 2020, 11 Pages.

* cited by examiner

THROTTLING BASED ON PHONE CALL DURATIONS

BACKGROUND

Computer-implemented services may often place phone calls to designated phone numbers as part of an automated operation. For instance, the services may place phone calls to designated phone numbers as part of a multifactor authentication operation, as part of an automated help desk operation, or the like. In some instances, malevolent actors may cause the services to place the phone calls for fraudulent purposes. One such fraudulent purpose is known as international revenue sharing fraud (IRSF), which may cause network operators to lose monetary resources. IRSF may often be carried out in the form of multiple calls of long durations to a certain phone number that, for instance, international carriers may terminate and for which the international carriers may charge high prices. Other types of fraudulent operations may include forgery, such as gateway forgery, credit card fraud, or the like.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer readable media for throttling calls placed by a service to a phone number based on durations of calls placed to the phone number meeting or exceeding a call duration threshold. That is, a processor may determine a call duration threshold assigned to an entity, in which the phone number may be associated with the entity. The processor may also track durations of one or more calls placed to the phone number by the service and/or by other services. The processor may further determine whether the tracked durations of the one or more calls placed to the phone number, e.g., the summed durations, meet or exceed the call duration threshold and based on a determination that the tracked durations meet or exceed the call duration threshold, may throttle placement of an additional call to the phone number.

As discussed herein, fraudulent or other malicious actors may cause the service to place as many calls to the phone number for as long as possible in order to maximize fraud associated with the placement of the calls. For instance, malicious actors may cause the service to place calls in furtherance of an IRSF scheme. This may result in the service and/or an owner of the service to incur fraudulent costs. Additionally, a technical issue associated with the placement of calls for fraudulent purposes may be that the service as well as the hardware hosting the service may waste computing and storage resources to place the calls. In addition, the hardware and network infrastructure that function, for instance, as a backbone for the placement of the calls may also waste energy and computing resources to place the calls.

Through implementation of the apparatuses, methods, and computer readable media disclosed herein, the number and duration of fraudulent calls being placed by a service may significantly be reduced. As a result, the costs borne by the service (or owner of the service) may be reduced. In addition, hardware technical improvements in the form of reduced processor, reduced storage, reduced network infrastructure, etc., utilization may be achieved. For instance, the reduction in the number and duration of fraudulent calls may reduce the total number of calls being placed, which may result in the reduced processor, reduced storage, reduced network infrastructure, etc., utilization.

Figure 1:
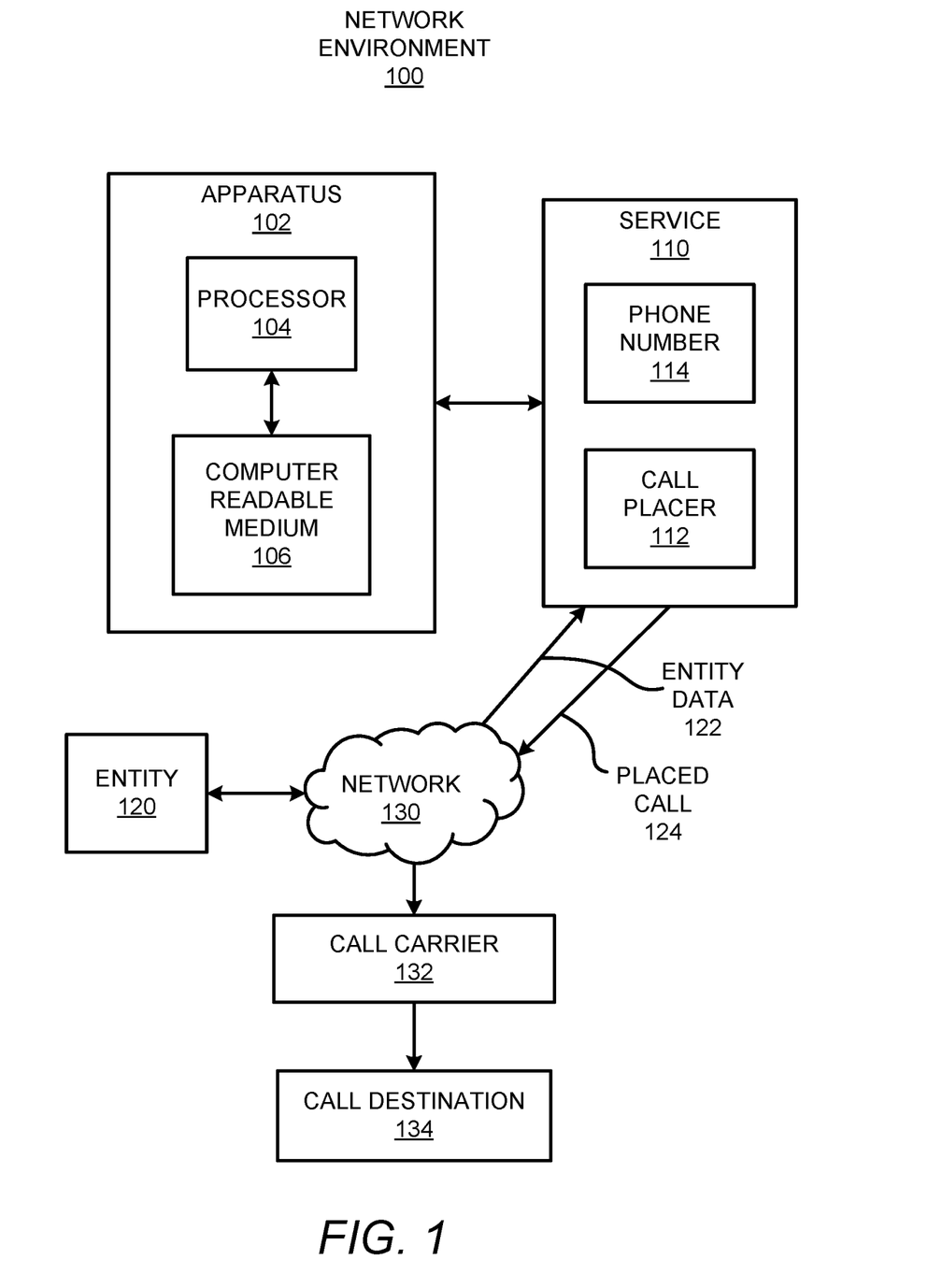
FIG. 1 depicts a block diagram of a network environment that may include an apparatus, in which the apparatus may manage placement of calls by a service, in accordance with an embodiment of the present disclosure.
Figure 2:
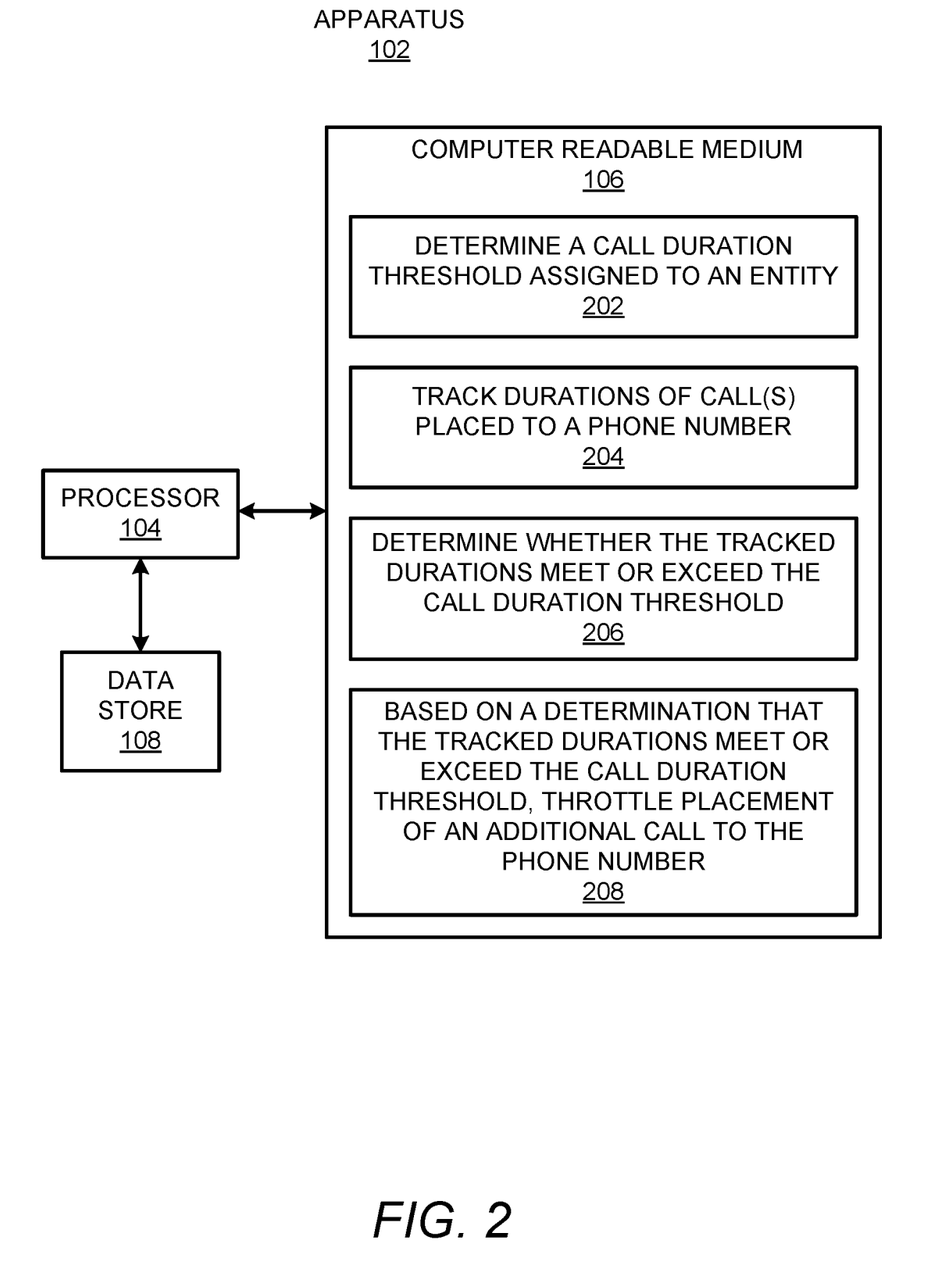
FIG. 2 shows a block diagram of the apparatus depicted in FIG. 1 in accordance with an embodiment of the present disclosure.

Reference is first made to FIGS. 1 and 2. FIG. 1 shows a block diagram of a network environment 100 that may include an apparatus 102, in which the apparatus 102 may manage placement of calls by a service 110, in accordance with an embodiment of the present disclosure. FIG. 2 shows a block diagram of the apparatus 102 depicted in FIG. 1, in accordance with an embodiment of the present disclosure. It should be understood that the network environment 100 and the apparatus 102 may include additional features and that some of the features described herein may be removed and/or modified without departing from the scopes of the network environment 100 and/or the apparatus 102.

The apparatus 102 may, for instance, be a server that may be employed in the network environment 100. The apparatus 102 may include a processor 104, a computer readable medium 106, and a data store 108. As shown, the apparatus 102 may communicate with an entity 120 via a network 130, which may include a local area network and/or a wide area network, such as the Internet. The network 130 may also or alternatively include a phone network such as a cellular network, a public switched telephone network, and/or the like.

According to examples, the service 110 may be a set of computer-implemented instructions, an application, or the like, that may place phone calls to designated phone numbers for any of a variety of purposes. For instance, the service 110 may place phone calls to designated phone numbers to provide one time codes that may be used for multi-factor authentication of a user to access a service, such as the service 110 or another service. As another example, the service 110 may place calls as part of a computer or other type of support service. In some examples, the service 110 may automatically place the phone calls during execution of instructions of the service 110, while in other examples, the service 110 may receive an instruction to place the phone calls. In any regard, the service 110 may include instructions to place calls (call placer 112) and may place calls to a phone number 114, e.g., a predefined phone number 114.

According to examples, a server or multiple servers may host and execute the service 110, e.g., the service 110 may be executed in a virtual machine or across multiple virtual machines. In some examples, the apparatus 102 may execute the service 110 while in other examples, another apparatus (not shown) may execute the service 110.

As also shown in FIG. 1, the network environment 100 may include an entity 120 that may provide entity data 122 to the service 110. The entity 120 may be an individual user or multiple users, such as members of an organization, or the like. For instance, the entity 120 may be a customer, an enterprise customer, a subscriber, or the like, of the service 110. In addition, or alternatively, the entity 120 may be located in a particular nation, region, and/or may fall into another aggregative property. In some examples, the apparatus 102 may manage calls placed by the service 110 for entities 120 that are located in a particular nation, region, and/or may fall into a particular aggregative property. In any regard, the entity 120 may provide various types of entity data 122 to the service 110 such that, for instance, the service 110 may place phone calls based on the entity data 122. The entity data 122 may include data pertaining to, for instance, identification of the phone number 114, a message that the service 110 is to play during a phone call, a condition under which the service 110 is to generate a code, a condition under which the service 110 is to place a phone call to the phone number 114, and/or the like.

According to examples, the service 110 may execute the call placer 112 to place a phone call 124 to the phone number 114 based on or in response to an occurrence of a condition identified in the entity data 122. In other examples, the service 110 may execute the call placer 112 to place the phone call 124 to the phone number 114 based on or in response to receipt of an instruction to place the phone call, for instance, from the apparatus 102 or another source of the instruction.

In some cases, the entity 120 may communicate the entity data 122 to the service 110 for fraudulent or other nefarious purposes. That is, for instance, the entity 120 may communicate the entity data 122 to cause the service 110 to place phone calls to a particular phone number 114 that is associated with a fraudulent operation and/or to a series of phone numbers that may be associated with a fraudulent operation. The fraudulent operation may involve, for instance, phone calls to the particular phone number 114 and/or to the series of phone numbers being routed through a particular call carrier 132 and to a particular call destination 134. In some examples, the entity 120 may cause the service 110 to send multiple calls to the series of phone numbers to target resources of a service provider, e.g., as a denial of service attack.

In some cases, the phone number 114 may be a premium phone number in which the service 110 may be charged a fee for calls made to the phone number 114. In some instances, call carriers 132, such as International Premium Rate Number (IPRN) providers, may provide infrastructures to run premium phone numbers to destinations. The call carriers 132 may charge relatively high fees to take up the phone calls and the telephone companies may pass down the costs to customers, e.g., the owner of the service 110. The company, e.g., the entity 120, that rented the premium phone number 114 may also receive a portion of the fees for driving phone calls 124 to the premium phone number 114 and may also receive fees based on the durations of the calls 124. As a result, the entity 120 may attempt to drive as many calls to the premium phone number 114 as possible and to have the durations of the calls last for as long as possible. In instances in which the entity 120 causes the service 110 to place calls to the series of phone numbers, the entity 120 may drive the calls to collect fees on calls placed to the series of phone numbers.

According to examples, the apparatus 102 may throttle placement of phone calls 124 to the phone number 114 based on a determination that the durations of one or more calls placed to the phone number 114 meet or exceed a predefined call duration threshold. In some instances, the apparatus 102 may throttle placement of the phone calls 124 by blocking the service 110 from placing an additional call to the phone number 114. As a result, for instance, fraudulent entities 120 may be unable to cause a large number of calls 124 of relatively long durations and/or in rapid succession to be placed to the phone number 114. The apparatus 102 may thus prevent costs associated with the placement and connection of fraudulent calls 124 to the call destination 134. The apparatus 102 may also reduce or prevent the number of fraudulent calls 124 being placed to the phone number 114, which may reduce consumption of processing resources employed by the service 110 to place calls, which may reduce consumption of network bandwidth, etc.

Additionally, and as discussed in greater detail herein, as the apparatus 102 may not throttle (or block) non-fraudulent calls 124, the apparatus 102 may still enable the service 110 to operate normally to place calls 124 that may not be for fraudulent purposes.

The processor 104 may be a semiconductor-based microprocessor, a central processing unit (CPU), an application specific integrated circuit (ASIC), a field-programmable gate array (FPGA), and/or other hardware device. Although the apparatus 102 is depicted as having a single processor 104, it should be understood that the apparatus 102 may include additional processors and/or cores without departing from a scope of the apparatus 102. In this regard, references to a single processor 104 as well as to a single computer readable medium 106 may be understood to additionally or alternatively pertain to multiple processors 104 and multiple computer readable mediums 106.

The computer readable medium 106 may be, for example, a Random Access memory (RAM), an Electrically Erasable Programmable Read-Only Memory (EEPROM), a storage device, an optical disc, or the like. The computer readable medium 106, which may also be referred to as a machine readable storage medium, may be a non-transitory computer readable storage medium, where the term "non-transitory" does not encompass transitory propagating signals. In any regard, the computer readable medium 106 may have stored thereon machine readable instructions 202-208.

The processor 104 may fetch, decode, and execute the instructions 202 to determine a call duration threshold assigned to an entity 120, in which a phone number 114 may be associated with the entity 120. As discussed herein, the phone number 114 may be a premium phone number for which a premium rate may be applied when calls are placed to the phone number 114. The call duration threshold may be a particular duration of time at which the service 110 is connected to phone number 114 regardless of the number of times that the service 110 places phone calls to the phone number 114.

The call duration threshold, which may equivalently be termed a predefined call duration threshold, a call duration allotment, or the like, may be predefined for the entity 120 based on any number of aspects. In some examples, the call duration threshold may be a set call duration that may be defined for all entities or a group of entities, e.g., about 2 minutes, about 5 minutes, or the like. The call duration threshold may be set to any of a number of call durations depending on the type of the entity 120, e.g., a first type of entity 120 may be assigned to a first call duration threshold, a second type of entity 120 may be assigned to a second call duration threshold, etc.

In addition or in other examples, the processor 104 may determine the call duration threshold for the entity 120 based on various aspects of calls made to the phone number 114 and/or to other phone numbers. For instance, the processor 104 may track calls placed by the service 110 to the phone number 114 and may determine an average number of calls placed to the phone number 114 over a certain time duration. The certain time duration may be, for instance, a day, a week, a month, or the like. The processor 104 may also determine an average duration per call placed to the phone number 114 over the certain time duration and may determine the call duration threshold assigned to the entity 120 based on the determined average number of calls and the determined average duration per call. For instance, the processor 104 may determine the call duration threshold for the entity 120 to be equal to a sum of the determined average durations of the calls placed to the phone number 114 during a particular time period, e.g., one day, multiple days, a certain number of hours, or the like.

The processor 104 may additionally or alternatively determine the call duration threshold for the entity 120 based on a trust level associated with the entity 120. That is, for instance, the processor 104 may determine a trust level associated with the entity 120, in which the trust level may be based on various factors associated with the entity. By way of example, the processor 104 may assign a trust level to the entity 120 based on a length of time that the entity 120 has been a customer of the service 110, a number of transactions that the entity 120 has performed with the service 110, a length of time that the entity 120 has been a customer of another service, whether the entity 120 has been flagged as potentially being a fraudulent actor, or the like. In these examples, the processor 104 may determine the call duration threshold for the entity 120 to be relatively longer or shorter based on the determined trust level associated with the entity 120. For instance, the processor 104 may assign a longer call duration threshold for the entity 120 in instances in which the entity 120 is assigned a higher trust level and may assign shorter call duration threshold for the entity 120 in instances in which the entity is assigned a lower trust level.

In some examples, the processor 104 may set the call duration threshold such that the service 110 may normally place non-fraudulent calls without restriction. That is, for instance, the processor 104 may determine that a certain number of calls having certain durations are known to be placed to phone numbers for non-fraudulent purposes and may set the call duration threshold (or equivalently, call duration allotment) based on the determined number of calls and the certain durations, e.g., a sum of the average number of calls and the average durations for a predetermined time period. As a result, the service 110 may place calls for non-fraudulent purposes until the sum of the durations of the calls meets or exceeds the call duration threshold. However, because the service 110 normally would not place calls having durations whose sum meets the call duration threshold, it may be unlikely that the service 110 would place calls to a certain phone number having a sufficient duration sum to meet the call duration threshold if the certain phone number was not being used to fraudulent purposes.

The processor 104 may fetch, decode, and execute the instructions 204 to track durations of one or more calls 124 placed to the phone number 114. For instance, when the service 110 places calls 124, the service 110 may inform the apparatus 102 that the calls 124 are being placed and the durations of the calls 124. The processor 104 may track each of the calls 124 that are placed and their respective durations based on the information received from the service 110. In addition, the processor 104 may add the durations of the calls 124 placed to the phone number 114 together to determine a summed duration of the calls 124 for a predetermined time period.

The processor 104 may fetch, decode, and execute the instructions 206 to determine whether the tracked durations of the one or more calls 124 placed to the phone number 114 meet or exceed the call duration threshold. That is, the processor 104 may determine whether the summed duration of the calls 124 placed to the phone number 114 over a certain time period meets or exceeds the call duration threshold.

The processor 104 may fetch, decode, and execute the instructions 208 to, based on a determination that the tracked durations meet or exceed the call duration threshold, throttle placement of an additional call 124 to the phone number 114. For instance, once the tracked durations are determined to meet or exceed the call duration threshold, the processor 104 may prevent the service 110 from placing the additional call 124 to the phone number 114. In some examples, the processor 104 may prevent the service 110 from placing the additional call 124 for a predetermined length of time. In these examples, the service 110 may normally operate to automatically place calls to the phone number 114 and the processor 104 may instruct or otherwise prevent the service 110 from placing the additional call 124 to the phone number 114 during the predetermined length of time. The predetermined length of time may be, for instance, a day, a set number of hours, a week, or the like.

In addition, the processor 104 may block placement of calls to the phone number 114 for a predetermined length of time beginning at a time at which the tracked durations are determined to meet or exceed the call duration threshold, block placement of calls to the phone number 114 according to a rolling throttling scheme, or the like. Under the rolling throttling scheme, the processor 104 may block placement of calls to the phone number 114, for instance, from a timing at which the durations of the calls placed to the phone number 114 were tracked. In other words, the predetermined length of time may begin prior to the time at which the tracked durations are determined to meet or exceed the call duration threshold and may thus expire at an earlier time.

In some examples, a plurality of phone numbers 114 may be associated with the entity 120, e.g., the entity 120 may have supplied the service 110 with entity data 122 that may identify a plurality of phone numbers 114. In these examples, the processor may, based on the determination that the tracked durations of the one or more calls placed to the phone number 114 meet or exceed the call duration threshold, throttle placement of calls to the plurality of phone numbers 114. Thus, for instance, based on a determination that the durations of calls 124 placed to one of the phone numbers 114 associated with the entity 120 meets or exceeds the call duration threshold, the processor 104 may throttle placement of an additional call to any of the phone numbers 114 associated with the entity 120.

According to examples, a plurality of phone numbers 114 may be associated with the entity 120. In these examples, the processor 104 may track durations of calls 124 placed to the plurality of phone numbers 114 associated with the entity 120. In addition, the processor 104 may determine whether the sum of the tracked durations of the calls 124 placed to the plurality of phone numbers associated with the entity meets or exceeds the call duration threshold. Based on a determination that the sum of the tracked durations meets or exceed the call duration threshold, the processor 104 may throttle placement of calls 124 to the plurality of phone numbers 114. In other words, the processor 104 may throttle placement of an additional call to the phone number 114 based on a determination that durations of calls made to a plurality of phone numbers associated with the entity 120 meet or exceed the call duration threshold.

According to examples, the phone number 114 may be associated with a plurality of entities 120 and a plurality of other phone numbers 114 may be associated with the plurality of entities 120. In these examples, based on the determination that the tracked durations meet or exceed the call duration threshold, the processor 104 may throttle placement of calls to the plurality of other phone numbers 114 associated with the plurality of entities 120.

Instead of the machine readable instructions 202-208, the apparatus 102 may include hardware logic blocks that may perform functions similar to the instructions 202-208. In other examples, the apparatus 102 may include a combination of instructions and hardware logic blocks to implement or execute functions corresponding to the instructions 202-208. In any of these examples, the processor 104 may implement the hardware logic blocks and/or execute the instructions 202-208. As discussed herein, the apparatus 102 may also include additional instructions and/or hardware logic blocks such that the processor 104 may execute operations in addition to or in place of those discussed above with respect to FIG. 2.

Figure 3:
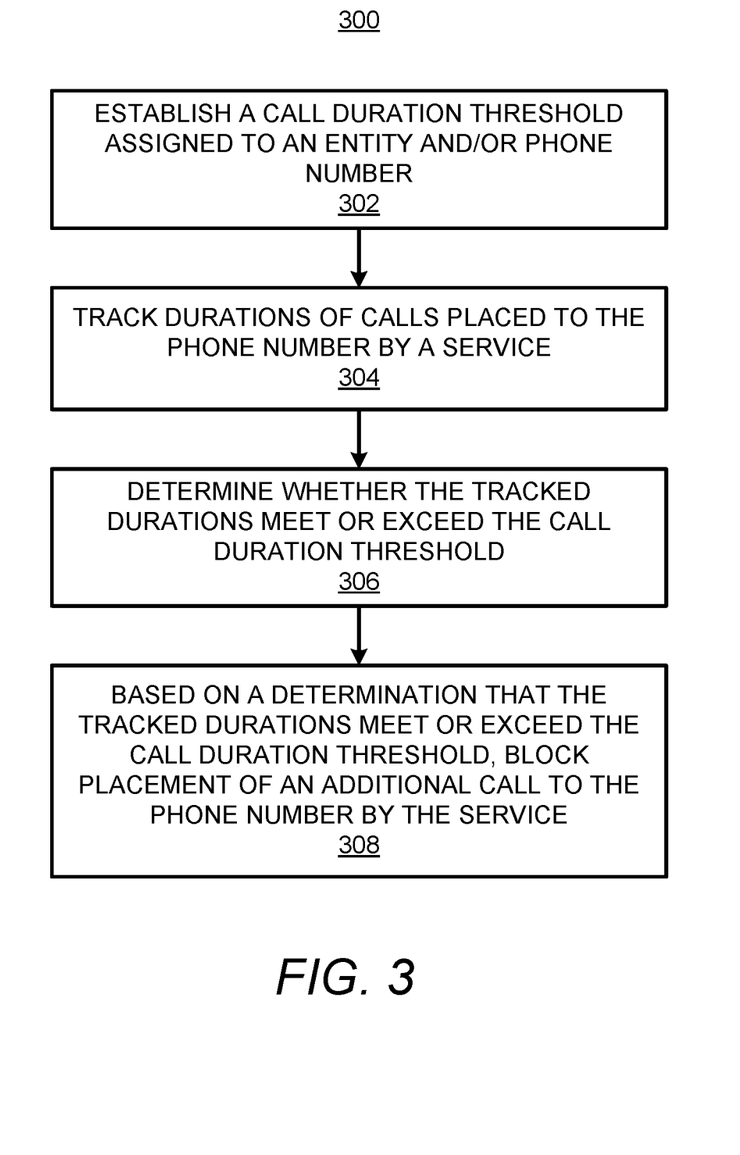
FIGS. 3 and 4, respectively, depict flow diagrams of methods for blocking placement of an additional call based on tracked durations of calls exceeding a call duration threshold, in accordance with an embodiment of the present disclosure.
Figure 4:
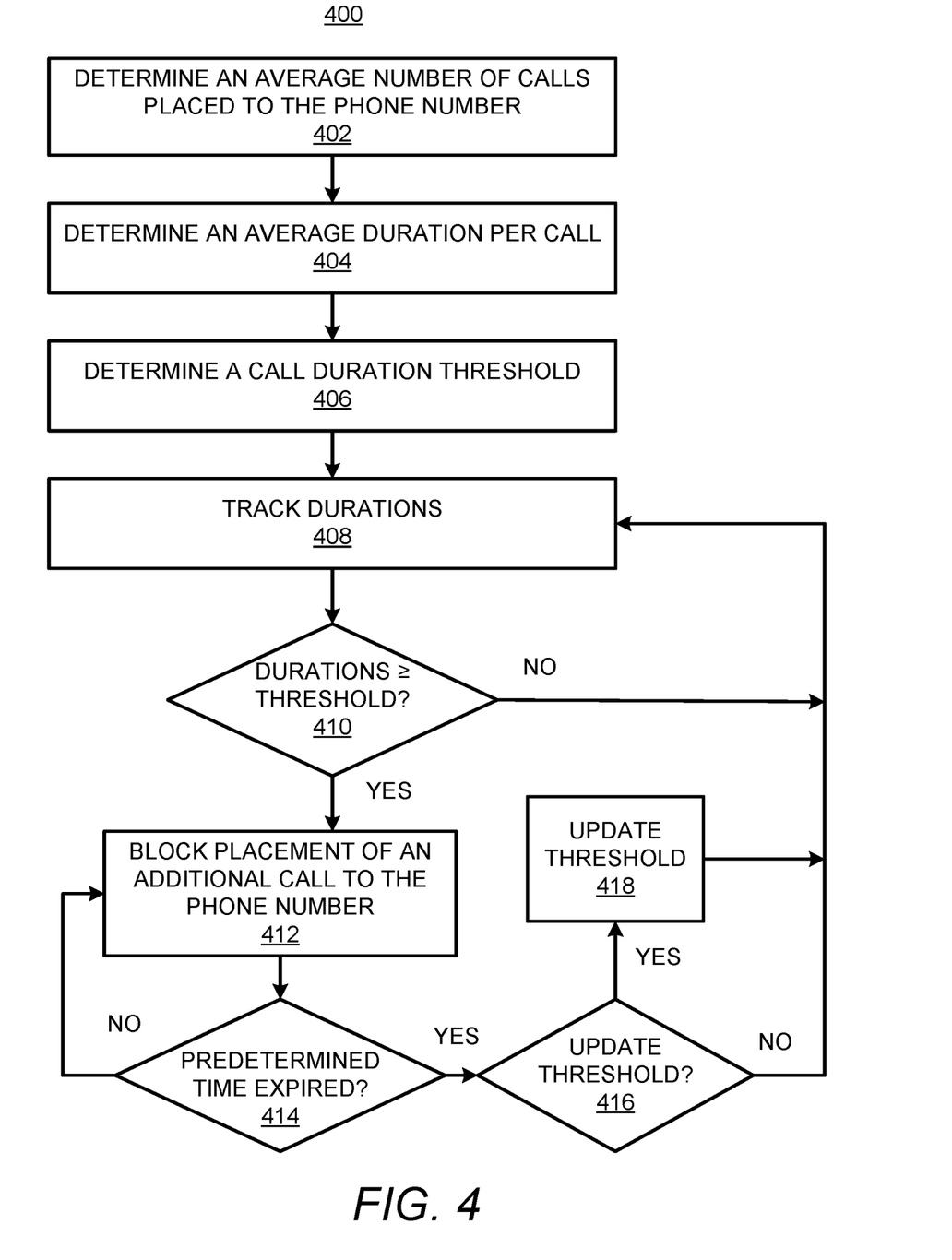

Various manners in which the processor 104 of the apparatus 102 may operate are discussed in greater detail with respect to the methods 300 and 400 respectively depicted in FIGS. 3 and 4. Particularly, FIGS. 3 and 4, respectively, depict flow diagrams of methods 300, 400 for blocking placement of an additional call 124 based on tracked durations of calls exceeding a call duration threshold, in accordance with embodiments of the present disclosure. It should be understood that the methods 300 and 400 depicted in FIGS. 3 and 4 may include additional operations and that some of the operations described therein may be removed and/or modified without departing from the scopes of the methods 300 and/or 400. The descriptions of the methods 300 and 400 are made with reference to the features depicted in FIGS. 1 and 2 for purposes of illustration.

At block 302, the processor 104 may establish a call duration threshold assigned to at least one of an entity 120 or a phone number 114, in which the phone number may be associated with the entity 120. As discussed herein, a call duration threshold may be determined based on any of a number of various factors including, for instance, a number of times a call is made to the phone number 114 during a predefined time period, average durations of the calls during the predefined time period, a trust level associated with an entity and/or phone number 114, or the like. However, in contrast to the discussion above, the call duration threshold may be associated with either or both of a phone number 114 or an entity 120 to which the phone number 114 is associated.

At block 304, the processor 104 may track durations of one or more calls 124 placed by a service 110 to the phone number 114. In addition, at block 306, the processor 104 determine whether the tracked durations meet or exceed the call duration threshold. Based on a determination that the tracked durations exceed the call duration threshold, at block 308, the processor 104 may block placement of an additional call to the phone number 114 by the service 110.

As disclosed herein, the processor 104 may block placement of the additional call 124 to the phone number 114 by the service 110 by blocking placement of the additional call 124 to the phone number 114 by the service 110 for a predetermined length of time, blocking placement of the additional call 124 to the phone number 114 according to a rolling throttling scheme, and/or the like.

Turning now to FIG. 4, at block 402, the processor 104 may determine an average number of calls placed to the phone number 114 over a certain time duration. At block 404, the processor 104 may determine an average duration per call placed to the phone number 114 over the certain time duration. In addition, at block 406, the processor 104 may establish the call duration threshold assigned to at least one of the entity 120 or the phone number 114 based on the determined average number of calls and the determined average duration per call. For instance, the processor 104 may determine the call duration threshold to be equal to a sum of the determined average durations of the calls for a particular time period, e.g., one day, multiple days, a certain number of hours, or the like.

At block 408, the processor 104 may track durations of one or more calls placed by a service 110 to the phone number 114. At block 410, the processor 104 may determine whether the tracked durations meet or exceed the call duration threshold, e.g., over a predefined time period. Based on a determination that the tracked durations do not meet or exceed the call duration threshold, the processor 104 may continue to track the durations and to compare the tracked durations with the call duration threshold at blocks 408 and 410. The processor 104 may continue to execute blocks 408 and 410 until the tracked durations are determined to meet or exceed the call duration threshold or the method 400 is stopped manually.

However, based on a determination at block 410 that the tracked durations meet or exceed the call duration threshold, at block 412, the processor 104 may block placement of an additional call 124 to the phone number 114 by the service 110. In some examples, the processor 104 may block placement of an additional call 124 for a predetermined time. In these examples, at block 414, the processor 104 may determine whether a predetermined time has expired. Based on a determination that the predetermined time has not expired, the processor 104 may continue to block placement of the additional call 124 until the predetermined time is determined to have expired at block 414.

Based on a determination that the predetermined time has expired, at block 416, the processor 104 may determine whether the call duration threshold is to be updated. The processor 104 may determine that the call duration threshold is to be updated, for instance, based on a determination by the processor 104 that the call duration threshold may not adequately protect the service 110 from placing fraudulent phone calls. In other examples, the processor 104 may determine that the call duration threshold is to be updated based on a determination that non-fraudulent phone calls are being blocked. Based on a determination that the call duration threshold is to be updated, the processor 104 may update the call duration threshold at block 418. However, based on a determination that the call duration threshold is not to be updated, the processor 104 may continue to track the call durations at block 408. In addition, the processor 104 may continue to execute blocks 408-418 until the processor 104 is instructed to stop execution of the method 400.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
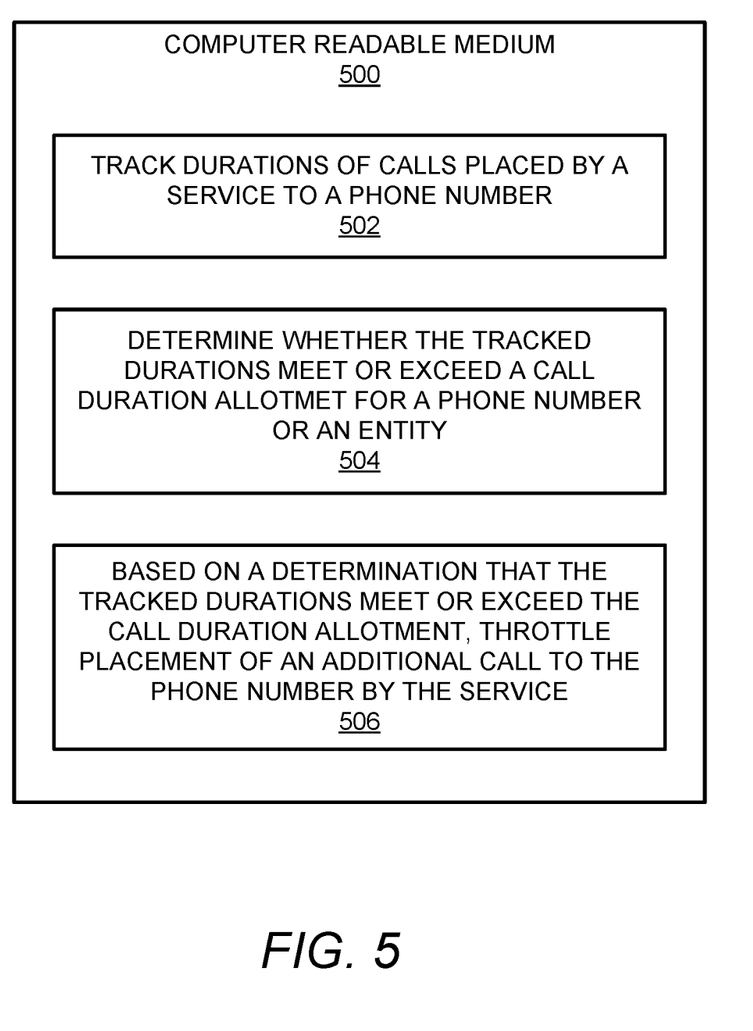
FIG. 5 depicts a block diagram of a computer readable medium that may have stored thereon machine readable instructions that when executed by a processor, may cause the processor to throttle placement of an additional call to a phone number by a service based on tracked durations of calls exceeding a call duration allotment for the phone number, in accordance with an embodiment of the present disclosure.

Turning now to FIG. 5, there is shown a block diagram of a computer readable medium 500 that may have stored thereon machine readable instructions that when executed by a processor, may cause the processor to throttle placement of an additional call 124 to a phone number 114 by a service 110 based on tracked durations of calls exceeding a call duration allotment for the phone number 114, in accordance with an embodiment of the present disclosure. It should be understood that the computer readable medium 500 depicted in FIG. 5 may include additional instructions and that some of the instructions described herein may be removed and/or modified without departing from the scope of the computer readable medium 500 disclosed herein. The computer readable medium 500 may be a non-transitory computer readable medium. The term "non-transitory" does not encompass transitory propagating signals.

The computer readable medium 500 may have stored thereon machine readable instructions 502-506 that a processor, such as the processor 104 depicted in FIGS. 1 and 2, may execute. The computer readable medium 500 may be an electronic, magnetic, optical, or other physical storage device that contains or stores executable instructions. The computer readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to track durations of one or more calls 124 placed by a service 110 to a phone number 114. The processor may fetch, decode, and execute the instructions 504 to determine whether the tracked durations meet or exceed a call duration allotment for the phone number 114 or an entity 120 to which the phone number 114 is associated. In addition, based on a determination that the tracked durations meet or exceed the call duration allotment, the processor may fetch, decode, and execute the instructions 506 to throttle placement of an additional call 124 to the phone number 114 by the service 110. In some examples, to throttle placement of the additional call 124, the processor may fetch, decode, and execute instructions to block placement of the additional call 124 to the phone number 114 by the service 110 for a predetermined length of time or block placement of the additional call 124 to the phone number 114 according to a rolling throttling scheme.

According to examples, the processor may fetch, decode, and execute additional instructions to determine an average number of calls placed to the phone number 114 over a certain time duration, determine an average duration per call placed to the phone number 114 over the certain time duration, and determine the call duration allotment for the phone number 114 or the entity 120 based on the determined average number of calls and the determined average duration per call.

According to examples, a plurality of phone numbers may be associated with the entity 120 and the processor may fetch, decode, and execute additional instructions to track durations of one or more calls 124 placed to the plurality of phone numbers 114 associated with the entity 120. The one or more calls 124 may include calls made by the service 110 and may also include calls made by other services (not shown). The processor may further determine whether the tracked durations of the one or more calls 124 placed to the plurality of phone numbers 114 associated with the entity 120 meet or exceed the call duration allotment. The processor may still further, based on a determination that the tracked durations meet or exceed the call duration allotment, throttle placement of calls to the plurality of phone numbers. In addition, or alternatively, the processor may, based on the determination that the tracked durations meet or exceed the call duration allotment, throttle placement of calls to the plurality of phone numbers for a predetermined length of time.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored machine readable instructions that cause the processor to:
   determine a call duration allotment assigned to an entity based on a sum of average time durations of a number of previous phone calls placed to a particular phone number for a predetermined time period, wherein the call duration allotment is an allotted duration of time during which a service is permitted to place phone calls to the particular phone number for the entity;

after determining the call duration allotment assigned to the entity, track durations of phone calls being placed by the service to the particular phone number for the entity;

determine whether a sum of the tracked durations of the phone calls being placed by the service to the particular phone number for the entity meets or exceeds the call duration allotment assigned to the entity; and based on a determination that the sum of the tracked durations of the phone calls placed to the particular phone number meets or exceeds the call duration allotment assigned to the entity, throttle a placement of additional phone calls by the service to the particular phone number.

2. The apparatus of claim 1, wherein the instructions are further to cause the processor to:

determine an average number of phone calls placed to the particular phone number over the predetermined time period; and determine the call duration allotment assigned to the entity additionally based on the determined average number of phone calls placed to the particular phone number over the predetermined time period.

3. The apparatus of claim 1, wherein a plurality of phone numbers are associated with the entity, and wherein the instructions are further to cause the processor to:

track durations of calls placed to the plurality of phone numbers associated with the entity;

determine whether a sum of the tracked durations of the calls placed to the plurality of phone numbers associated with the entity meets or exceeds the call duration allotment; and based on a determination that the sum of the tracked durations of the calls placed to the plurality of phone numbers meets or exceeds the call duration allotment, throttle a placement of additional calls to the plurality of phone numbers.

4. The apparatus of claim 1, wherein a plurality of phone numbers are associated with the entity, and wherein the instructions are further to cause the processor to:

based on the determination that a sum of durations of calls placed to the plurality of phone numbers meets or exceeds the call duration allotment, throttle a placement of additional calls to the plurality of phone numbers.

5. The apparatus of claim 1, wherein the particular phone number is associated with a plurality of entities, a plurality of other phone numbers being associated with the plurality of entities, and wherein the instructions are further to cause the processor to:

based on the determination that the sum of the tracked durations of the phone calls place to the particular phone number meets or exceeds the call duration allotment, throttle a placement of phone calls to the plurality of other phone numbers associated with the plurality of entities.

6. The apparatus of claim 1, wherein the service is to automatically place the phone calls to the particular phone number and wherein the instructions are further to cause the processor to:

throttle the placement of the phone calls made by the service to the particular phone number for a predetermined length of time.

7. The apparatus of claim 1, wherein, to throttle the placement of the additional phone calls to the particular phone number, the instructions are further to cause the processor to:

block the placement of the additional phone calls to the particular phone number for a predetermined length of time beginning at a time at Which the sum of the tracked durations is determined to meet or exceed the call duration allotment; or block the placement of the additional phone calls to the particular phone number according to a rolling throttling scheme.

8. A method comprising:

establishing, by a processor, a call duration allotment assigned to an entity based on a sum of average time durations of a number of previous phone calls placed to a particular phone number for a predetermined time period, wherein the call duration allotment is an allotted duration of time during which a service is permitted to place phone calls to the particular phone number for the entity;

after establishing the call duration allotment assigned to the entity, tracking, by the processor, durations of phone calls being placed by the service to the particular phone number for the entity;

determining, by the processor, whether a sum of the tracked durations meet or exceeds the call duration allotment assigned to the entity; and based on a determination that the sum of the tracked durations meets or exceeds the call duration allotment, blocking, by the processor, a placement of additional phone calls to the particular phone number by the service.

9. The method of claim 8, wherein blocking the placement of the additional phone calls to the particular phone number by the service further comprises:

blocking the placement of the additional phone calls to the particular phone number by the service for a predetermined length of time; or blocking the placement of the additional phone calls to the particular phone number according to a rolling throttling scheme.

10. The method of claim 8, further comprising:

determining an average number of phone, calls placed to the particular phone number over the predetermine time period; and establishing the call duration allotment assigned to the entity additionally based on the determined average number of phone calls placed to the particular phone number over the predetermined time period.

11. The method of claim 8, wherein a plurality of phone numbers are associated with the entity, and wherein the method further comprises:

tracking durations of phone calls placed to the plurality of phone numbers associated with the entity;

determining whether a sum of the tracked durations of the phone calls placed to the plurality of phone numbers associated with the entity meets or exceeds the call duration allotment; and based on a determination that the sum of the tracked durations of the phone calls placed to the plurality of phone numbers meets or exceeds the call duration allotment, blocking a placement of additional calls to the plurality of phone numbers.

12. The method of claim 8, wherein a plurality of phone numbers are associated with the entity, and wherein the method further comprises:

based on the determination that a sum of durations of calls placed to the plurality of phone numbers meets or exceeds the call duration allotment, blocking a placement of additional calls to the plurality of phone numbers for a predetermined length of time.

13. The method of claim 8, wherein the particular phone number is associated with a plurality of entities, a plurality of other phone numbers being associated with the plurality of entities, and wherein the method further comprises:
based on the determination that the sum of the tracked durations of the phone calls placed to the particular phone number meets or exceeds the call duration allotment, blocking a placement of additional calls to the plurality of other phone numbers associated with the plurality of entities for a predetermined length of time.

14. A non-transitory computer readable medium on which is stored machine readable instructions that when executed by a processor, cause the processor to:
determine a call duration allotment assigned to an entity based on a sum of average time durations of a number of previous phone calls placed to a particular phone number for a predetermined time period, wherein the call duration allotment is an allotted duration of time during which a service is permitted to place phone calls to the particular phone number for the entity;
after determining the call duration allotment assigned to the entity, track durations of phone calls placed by a service to the particular phone number for the entity;
determine whether a sum of the tracked durations meets or exceeds the call duration allotment assigned to the entity; and
based on a determination that the sum of the tracked durations of the phone calls placed to the particular phone number meets or exceeds the call duration allotment assigned to the entity, throttle a placement of additional phone calls to the particular phone number by the service.

15. The non-transitory computer readable medium of claim 14, wherein the instructions are further to cause the processor to:
determine an average number of phone calls placed to the particular phone number over the predetermined time period; and
determine the call duration allotment assigned to the entity additionally based on the determined average number of phone calls placed to the particular phone number over the predetermined time period.

16. The non-transitory computer readable medium of claim 14, Wherein to throttle the placement of the additional phone calls to the particular phone number, the instructions are further to cause the processor to:
block the placement of the additional phone calls to the particular phone number by the service for a predetermined length of time; or
block the placement of the additional phone calls to the particular phone number according to a rolling throttling scheme.

17. The non-transitory computer readable medium of claim 14, wherein a plurality of phone numbers are associated with the entity, and wherein the instructions are further to cause the processor to:
track durations of calls placed to the plurality of phone numbers associated with the entity;
determine whether a sum of the tracked durations of the calls placed to the plurality of phone numbers associated with the entity meets or exceeds the call duration allotment; and
based on a determination that the sum of the tracked durations of the calls placed to the plurality of phone numbers meets or exceeds the call duration allotment, throttle a placement of additional calls to the plurality of phone numbers.

18. The non-transitory computer readable medium of claim 14, wherein a plurality of phone numbers are associated with the entity, and wherein the instructions are further to cause the processor to:
based on the determination that the sum of the tracked durations of the phone calls place to the particular phone number meets or exceeds the call duration allotment, throttle a placement of additional calls to the plurality of phone numbers for a predetermined length of time.

* * * * *